(12) United States Patent
Cha (10) Patent No.: US 7,369,736 B2
(45) Date of Patent: May 6, 2008

(54) LIGHT TUNNEL, UNIFORM LIGHT ILLUMINATING DEVICE AND PROJECTOR EMPLOYING THE SAME

(75) Inventor: Yong-dok Cha, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/923,876

(22) Filed: Aug. 24, 2004

(65) Prior Publication Data

US 2005/0084210 A1 Apr. 21, 2005

(30) Foreign Application Priority Data

Oct. 17, 2003 (KR) .................. 10-2003-0072500

(51) Int. Cl.
*G02B 6/00* (2006.01)
(52) U.S. Cl. .................. 385/133; 385/147; 359/598
(58) Field of Classification Search ................. 385/133
See application file for complete search history.

(56) References Cited

U.S. PATENT DOCUMENTS 5,515,244 A * 5/1996 Levins et al. ............... 362/551
5,604,837 A * 2/1997 Tanaka ....................... 385/147
6,324,330 B1 * 11/2001 Stites .......................... 385/133
6,332,688 B1 * 12/2001 Magarill .................... 359/858
6,417,508 B1 * 7/2002 Ogura et al. ............. 250/227.2
6,419,234 B1 * 7/2002 Yu .............................. 277/434
2004/0036967 A1 * 2/2004 Haggerty et al. .......... 359/443
2004/0070970 A1 * 4/2004 Chang ....................... 362/234
2004/0091208 A1 * 5/2004 Doi ............................ 385/31
2004/0184012 A1 * 9/2004 Hori .......................... 353/99
2004/0206988 A1 * 10/2004 Glebov ...................... 257/244

FOREIGN PATENT DOCUMENTS

CN 1549047 A 11/2004

* cited by examiner

*Primary Examiner*—Frank G. Font
*Assistant Examiner*—Eric Wong
(74) *Attorney, Agent, or Firm*—Sughrue Mion, PLLC (57) ABSTRACT

Provided is a light tunnel including a guide member for guiding an incident light to proceed therein while being reflected by a side wall thereof to merge the incident light into a uniform light beam, and an optical path change portion provided at least one end portion of the guide member inclined at a predetermined angle with respect to an optical axis of an incident light to reflect the incident light and direct a path thereof.

24 Claims, 7 Drawing Sheets

LIGHT TUNNEL, UNIFORM LIGHT ILLUMINATING DEVICE AND PROJECTOR EMPLOYING THE SAME

BACKGROUND OF THE INVENTION

This application claims the priority of Korean Patent Application No. 2003-72500, filed on Oct. 17, 2003, in the Korean Intellectual Property Office, the disclosure of which is incorporated herein in its entirety by reference.

1. Field of the Invention

The present invention relates to a light tunnel for providing a uniform light which has an improved structure enabling a compact optical arrangement, a uniform light illuminating device using the light tunnel, and a projector which employs the light tunnel and the uniform light illuminating device.

2. Description of the Related Art

In general, projectors provide an image onto a screen by using an illuminating device and an image display device. Image display devices include digital micro-mirror devices (DMDs), transmission type LCDs and reflection type liquid crystal on silicon (LCOSs). A uniform light illuminating device makes light emitted from a lamp have a uniform profile and is widely used in projection optical devices such as projectors.

Figure 1:
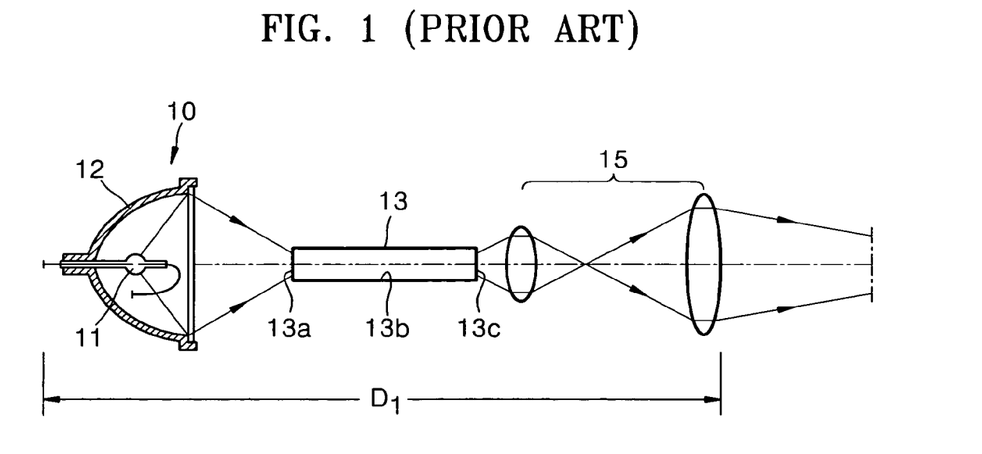
FIG. 1 is a view illustrating the optical arrangement of a conventional uniform light illuminating device.

Referring to FIG. 1, a conventional uniform light illuminating device includes a light source 10 emitting light, a light tunnel 13 converting the light emitted from the light source 10 to a uniform light and a relay lens unit 15.

The light source 10 includes a lamp 11 for generating light, and a reflection mirror 12 for reflecting part of the light emitted from the lamp 11 along a predetermined light path. The lamp 11 generates light utilizing arc discharge. Thus, the light emitted from the light source 10 is not uniform because the light is affected by the arc gap and by the portion of the light emitted from the lamp 11 which is not reflected by the reflection mirror 12.

The light tunnel 13 can be a glass rod having a cube shape which changes the light emitted from the light source 10 to a uniform light. That is, light incident on an incident surface 13a of the light tunnel 13 at a predetermined inclination angle is totally reflected by a side wall 13b and proceeds toward an exit surface 13c. Accordingly, by scrambling the incident light using a total reflection principle, a uniform light is produced from the light tunnel 13.

In the light tunnel 13, the incident surface 13a and the exit surface 13c are arranged to direct the ultimately reflected light rays in opposite directions from the incoming light rays. In the conventional uniform light illuminating device, the light source 10 is disposed to face the incident surface 13a and the relay lens unit 15 is disposed to face the exit surface 13c. Thus, the width $D_1$ of the uniform light illuminating device is determined by the overall arrangement of the light source 10, the light tunnel 13 and the relay lens unit 15 such that a large space is needed to accommodate these components. However, when the uniform light illuminating device is used in a projector, the components must fit in a limited amount of space.

SUMMARY OF THE INVENTION

To solve the above and/or other problems, the present invention provides a light tunnel which can change an optical path, a uniform light illuminating device adopting the light tunnel, and a projector employing the light tunnel and the uniform light illuminating device.

According to an aspect of the present invention, a light tunnel comprises a guide member for guiding an incident light to proceed therein while being reflected by a side wall thereof, to transform the incident light into a uniform light and an optical path change portion provided at at least one end portion of the guide member, and inclined at a predetermined angle with respect to an optical axis of an incident light, to reflect the incident light and direct a subsequent path thereof.

According to another aspect of the present invention, a uniform light illuminating device comprises a light source for generating light and emitting the generated light in one direction, a light tunnel arranged to face the light source for altering the direction of the light rays emitted from the light source and for producing a uniform light at exit and a relay lens unit arranged to face an exit surface of the light tunnel for condensing and/or diverging the light rays from the light tunnel for focusing on an image surface.

According to yet another aspect of the present invention, a projector comprises a light source for generating light and emitting the generated light in one direction, a light tunnel arranged to face the light source for altering the direction of the light rays emitted from the light source and for producing a uniform light at exit and an image forming unit forming an image by selectively transmitting or reflecting the light rays transmitted from the light tunnel, an optical path change unit arranged along an optical path between the light tunnel and the image forming unit for changing the optical path so that the light rays exiting the light tunnel pass through the image forming unit and proceed toward a screen and a projection lens unit for projecting an image formed by the image forming unit on the screen.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 2:
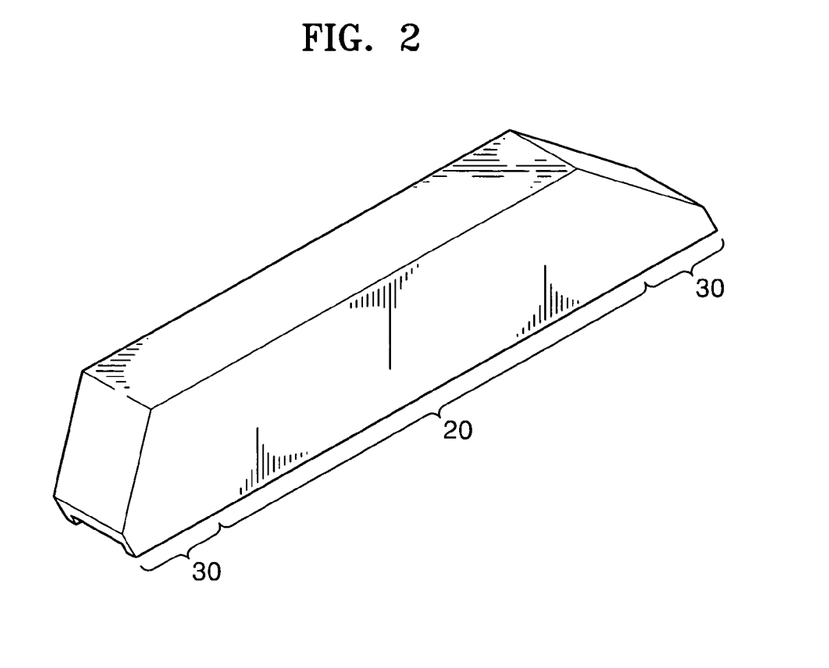
FIG. 2 is a perspective view of a light tunnel according to a first embodiment of the present invention.
Figure 3:
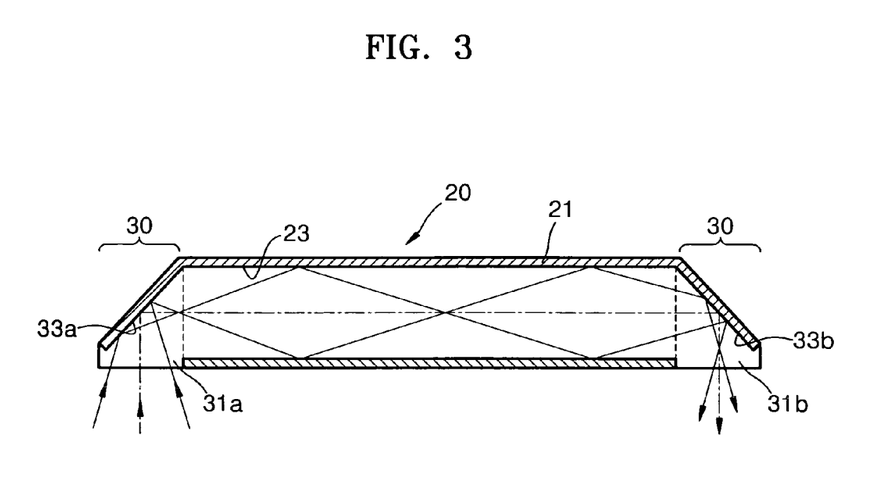
FIG. 3 is a sectional view of the light tunnel of FIG. 2.

Referring to FIGS. 2 and 3, a light tunnel according to a first embodiment of the present invention includes a guide member 20 for directing incident light rays and outputting a uniform beam of light and an optical path change portion 30 provided at either end of the guide member 20.

The guide member 20 includes a mirror case 21 encompassing an inner space in which light travels, and a reflection portion 23 formed on an inner wall of the mirror case 21. Light rays striking the guide member 20 at a predetermined inclination angle are reflected by the reflection portion 23 and proceeds while being scrambled. Thus, the light rays passing through the guide member 20 are merged into a uniform light beam having a beam profile which is different from that of the incident light rays.

The optical path change portion 30 is provided at either end of the guide member 20 to redirect the path of the incident light rays. The optical path change portion 30 includes first and second opening portions 31a and 31b through which light rays enter and exit and first and second reflection mirrors 33a and 33b arranged at each end of the mirror case 21 which are inclined at predetermined angles which may be the same or different then each other.

The light entering the first opening portion 31a is reflected by the first reflection mirror 33a and is directed into the mirror case 21 where its optical path changes. The light rays traveling through the mirror case 21 are reflected by the reflection portion 23 and proceeds toward the second reflection mirror 33b. The light rays are merged while traveling through the inside of the mirror case 21 and strike the second reflection mirror 33b where they are reflected and exit through the second opening portion 31b.

Figure 4:
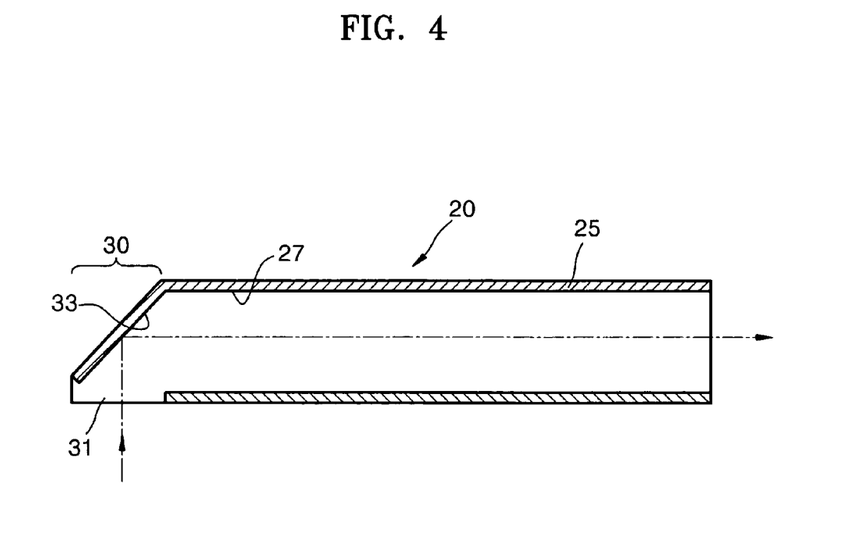
FIG. 4 is a sectional view of a light tunnel according to a second embodiment of the present invention.

Compared to the first embodiment, a light tunnel according to the second embodiment differs in that the structure of the optical path change portion 30 is modified. Referring to FIG. 4, the optical path change portion 30 includes, at one end of a mirror case 25, an opening portion 31 through which light rays enter and a reflection mirror 33 arranged at this end of the mirror case 25 which is inclined at a predetermined angle such that the light rays entering the opening portion 31 are directed inside the mirror case 25. Thus, the light rays entering the opening portion 31 are reflected by the reflection mirror 33 and travel along the inside of the mirror case 25. The light rays traveling inside the mirror case 25 are reflected by a reflection portion 27 and then exits through the other end portion of the mirror case 25.

Although in FIG. 4 the optical path change portion 30 is provided at the incident end portion of the mirror case, it can also be provided at the exit end portion of the mirror case.

Figure 5:
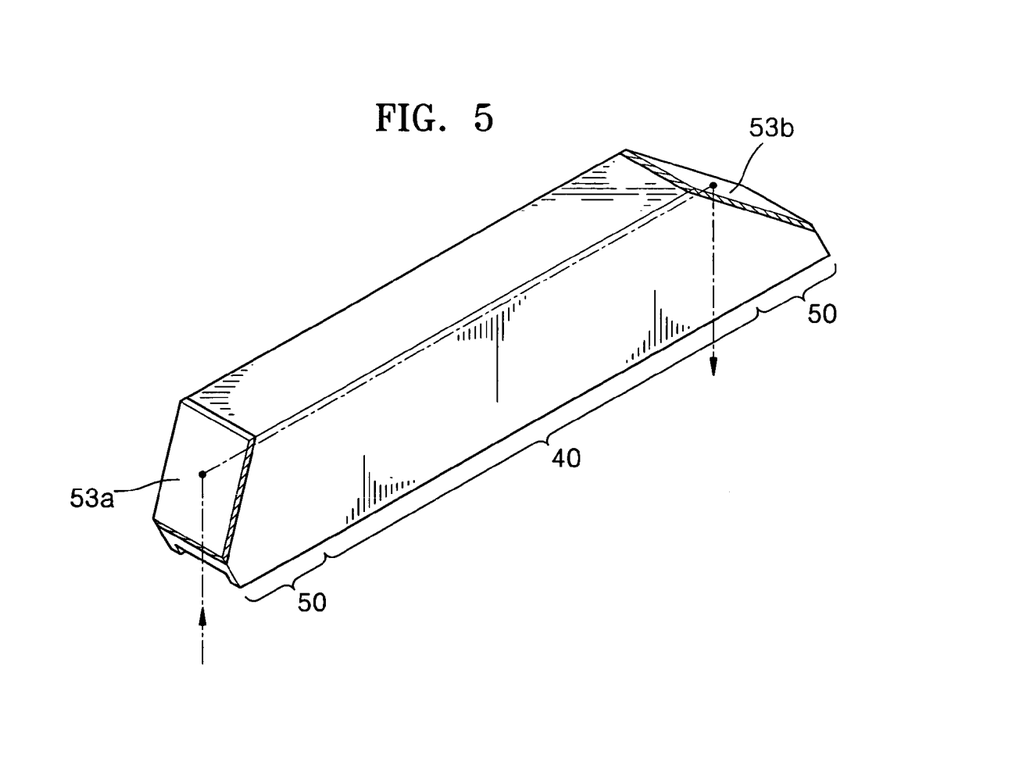
FIG. 5 is a sectional view of a light tunnel according to a third embodiment of the present invention.
Figure 6:
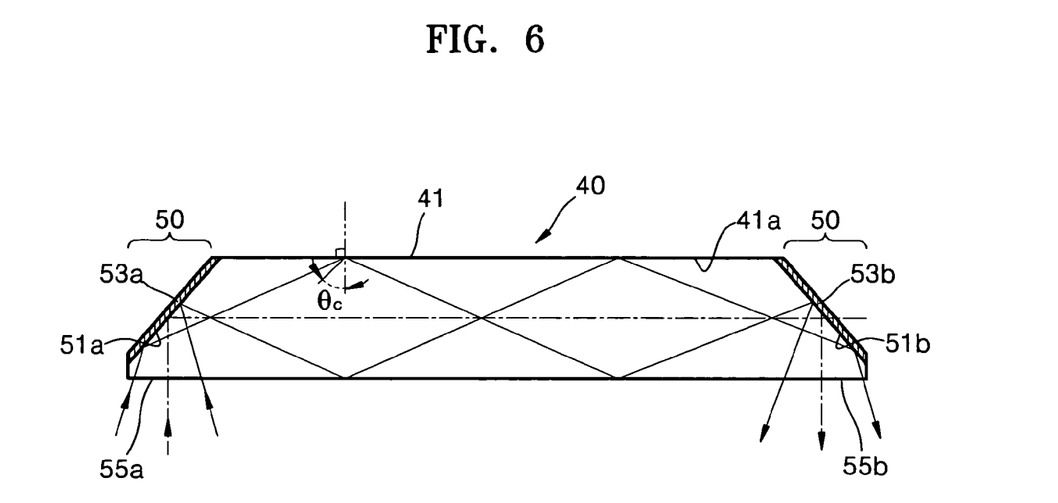
FIG. 6 is a sectional view of the light tunnel of FIG. 5.

Referring to FIGS. 5 and 6, a light tunnel according to a third embodiment of the present invention includes a guide member 40 for redirecting incident light rays and outputting a uniform beam of light and an optical path change portion 50 provided at an end portion of the guide member 40.

The guide member 40 is a glass rod 41 which directs incident light rays at a predetermined angle to be reflected and transported therein. The light rays are reflected inside the guide member 40 when they strike a side wall of the guide member 40 at an angle greater than a critical angle $\theta_c$ due to a difference in refractive index between the glass forming the glass rod 41 and an external medium, for example, air. Accordingly, the light rays traveling through the guide member 40 are reflected to produce a uniform beam of light which differs from the beam profile of the incident light rays.

Optical path change portions 50 are provided at both end portions of the guide member 40 which redirect the path of the incident light. The optical path change portion 50 includes first and second inclination portions 51a and 51b and first and second reflection mirrors 53a and 53b formed about the first and second inclination portions 51a and 51b, respectively. Each of the first and second inclination portions 51a and 51b is inclined at a predetermined angle with respect to the side wall of the guide member 40 and redirect the path of the incident light by reflection.

Thus, the light rays passing through an opening 55a are reflected by the first reflection mirror 53a and travel within the glass rod 41 with their subsequent path redirected. The light rays traveling in the glass rod 41 are reflected by the side wall 41a and continue to proceed towards the second reflection mirror 53b. The light rays are merged while traveling through the glass rod 41 and reflected by the second reflection mirror 53b, exiting through an exit opening 55b.

Figure 7:
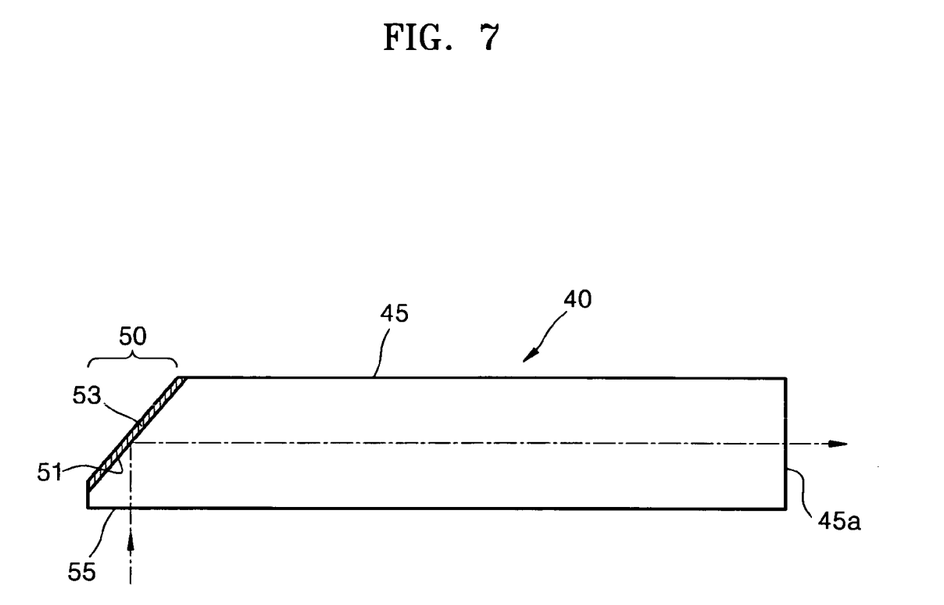
FIG. 7 is a sectional view of a light tunnel according to a fourth embodiment of the present invention.

A light tunnel according to a fourth embodiment of the present invention is characteristic in that the structure of an optical path change portion 50 is modified, compared to the third embodiment.

Referring to FIG. 7, the optical path change portion 50 is provided at one end of the guide member 40 to redirect the path of incident light rays. The optical path change portion 50 redirects the path of the light passing through an opening 55 provided at an area extending from a side wall of the guide member 40, and includes an inclination portion 51 and a reflection mirror 53 formed at an outer side of the inclination portion 51.

Thus, the light passing through the opening 55 is reflected by the reflection mirror 53 and travels through to the inside of the glass rod 45 with its optical path redirected. The incident light rays exit through an opposite end portion 45a of the glass rod 45.

Although in FIG. 7 the optical path change portion 50 is provided at the incident end portion of the guide member 40, it can also be provided at the exit end portion of the guide member 40.

By forming the light tunnel as directed above, the optical path of light entering or exiting the glass rod 45 can be changed and the optical arrangement of an optical apparatus adopting the light tunnel is both compact and easy to form.

Figure 8:
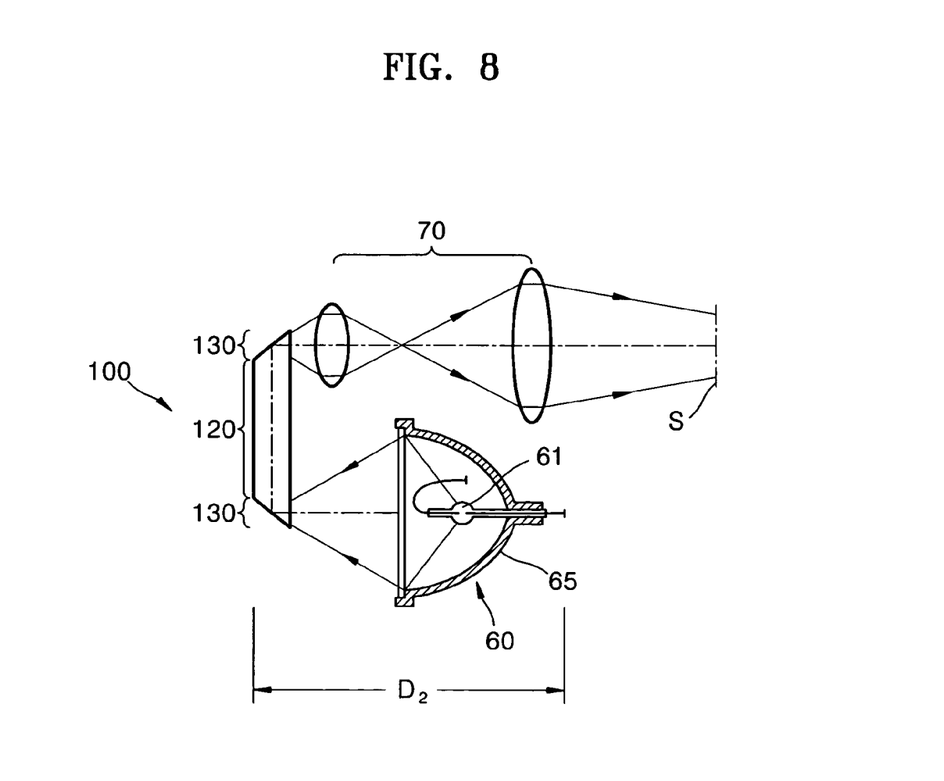
FIG. 8 is a view illustrating the optical arrangement of a uniform light illuminating device according to an embodiment of the present invention.

Referring to FIG. 8, a uniform light illuminating device according to an embodiment of the present invention includes a light source 60, a light tunnel 100 which changes light emitted from the light source 60 into a uniform light beam, and a relay lens unit 70 which condenses and/or diverges an incident light so that light passing through the light tunnel 100 is formed on an image surface.

The light source 60 includes a lamp 61 for generating light and a reflection mirror 65 for directing the light generated by the lamp 61 to proceed in one direction. The reflection mirror 65 can be either an oval mirror or a parabolic mirror according to the shape of its curvature. Since the structure of the light source 60 is widely known in the field to which the present invention pertains, a detailed description thereof will be omitted herein.

The light tunnel 100 is provided along an optical path between the light source 60 and the relay lens unit 70 to redirect the path of the light emitted from the light source 60 and simultaneously make the light output therefrom a uniform light beam.

To this end, the light tunnel 100 includes a guide member 120 and optical path change portions 130 which are provided at either end of the guide member 120 for redirecting the a path of incident light rays. Since the light tunnel 100 is substantially the same as the light tunnels according to the first and third embodiments described with reference to FIGS. 2 and 3 and FIGS. 5 and 6, respectively, a detailed description thereof will be omitted herein.

By using the light tunnel having the improved structure described above, because the light source 60 and the relay lens unit 70 are disposed at one side of the light tunnel 100, only a space corresponding to the depth of the light source 60 or the relay lens unit 70 is needed. Thus, the depth $D_2$ required to arrange all optical elements is reduced compared to the width $D_1$ shown in FIG. 1. Therefore, a compact uniform light illustrating device can be realized by reducing a space occupied by the light tunnel 100 when the light source 60 and the relay lens unit 70 are optically arranged as above.

Figure 9:
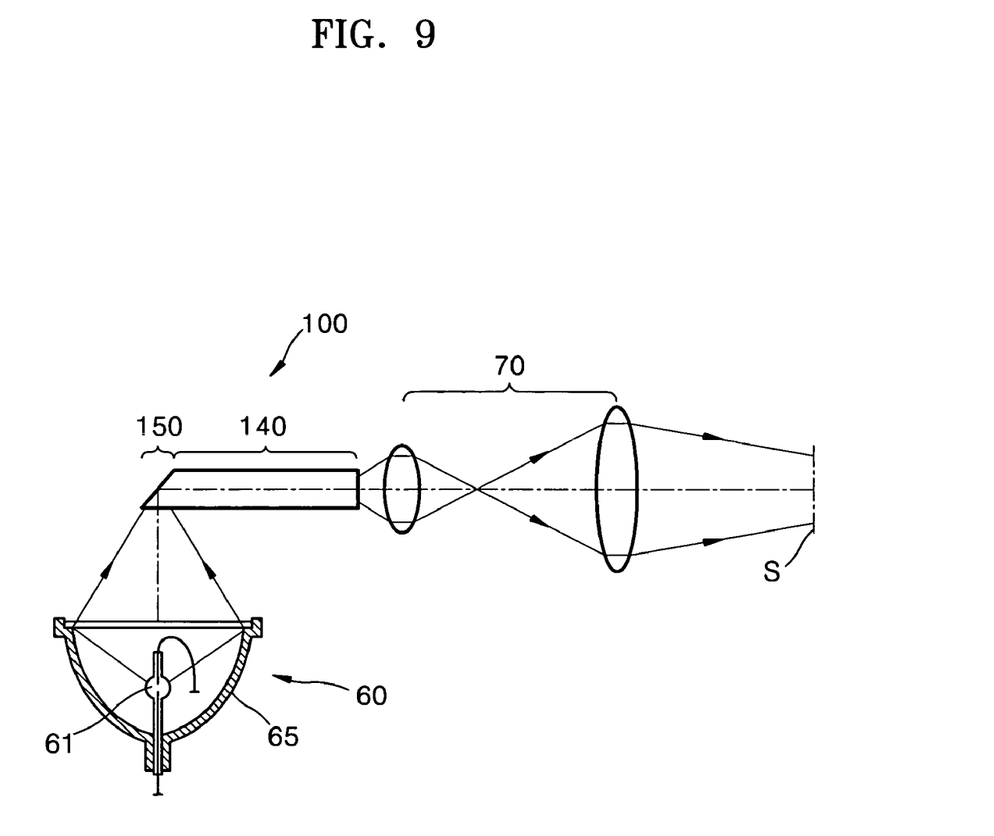
FIG. 9 is a view illustrating the optical arrangement of a uniform light illuminating device according to another embodiment of the present invention.

Referring to FIG. 9, a uniform light illuminating device according to another embodiment of the present invention includes a light source 60, a light tunnel 100 which changes light emitted from the light source 60 into a uniform light beam, and a relay lens unit 70 which condenses and/or diverges an incident light so that light passing through the light tunnel 100 is formed on an image surface. Since the light source 60 and the relay lens unit 70 are the same as those in the above-described embodiment, detailed descriptions thereof are omitted herein.

The light tunnel 100 is provided along an optical path between the light source 60 and the relay lens unit 70. The light tunnel 100 redirects the light emitted from the light source 60 by about 90° and simultaneously makes light output therefrom a uniform light beam.

To this end, the light tunnel 100 includes a guide member 140 and an optical path change portion 150, provided at one end of the guide member 140, for redirecting the path of incident light rays. Since the light tunnel 100 is substantially the same as the light tunnel according to the second and fourth embodiments described with reference to FIGS. 4 and 7, respectively, a detailed description thereof will be omitted herein.

As described above, by using the light tunnel having an optical path change function, without employing optical elements such as an additional reflection mirror, the optical arrangement of the light source and the relay lens unit in a given space can be performed with ease and the uniform light illuminating apparatus can be made compact.

Figure 10:
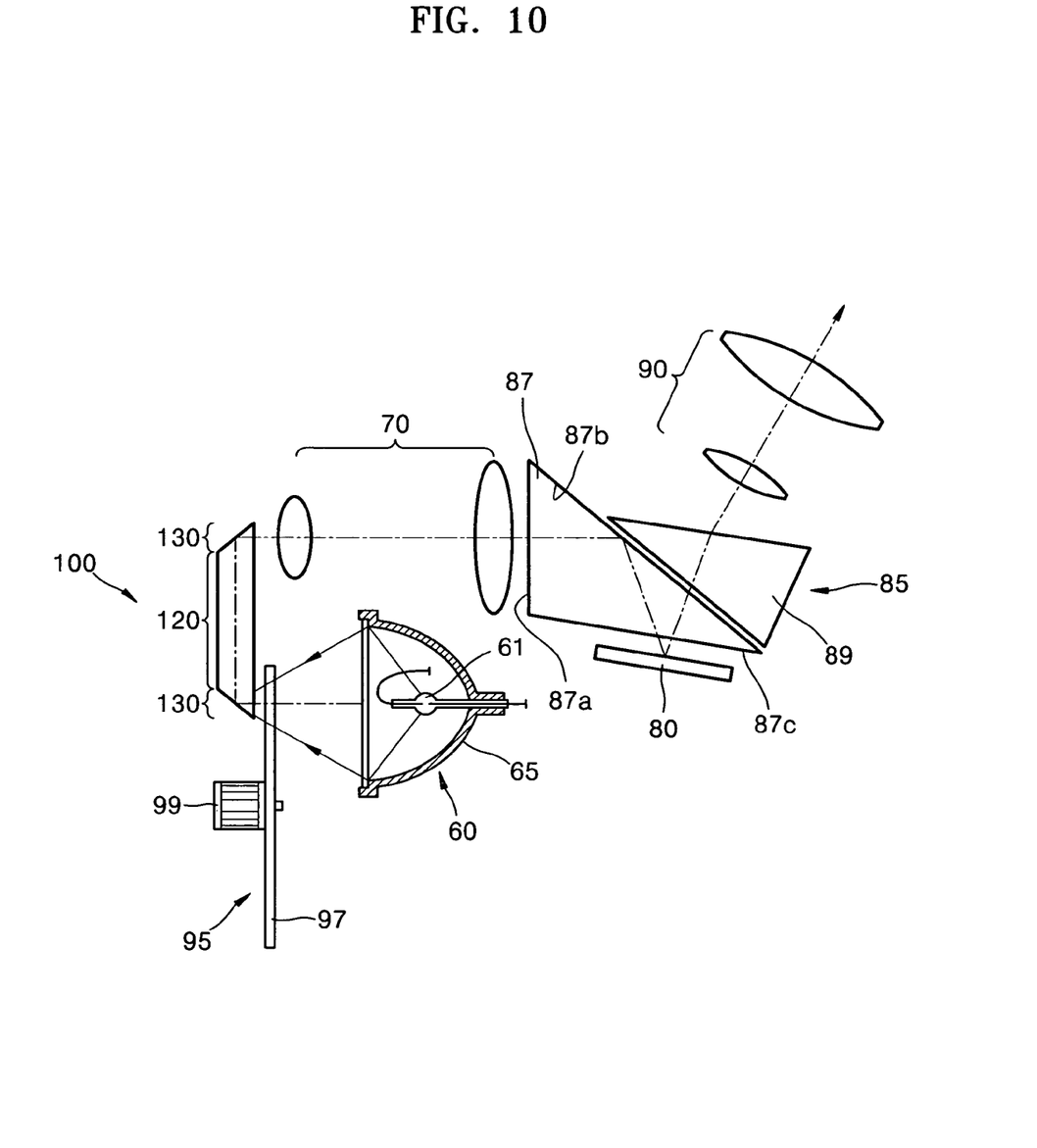
FIG. 10 is a view illustrating the optical arrangement of a projector according to an embodiment of the present invention.

Referring to FIG. 10, a projector according to an embodiment of the present invention includes a light source 60, a light tunnel 100 which changes light emitted from the light source 60 into a uniform light beam, an image forming unit 80 which forms an image, an optical path change unit 85 which changes an optical path so that an image formed by the image forming unit 80 is directed towards a screen (not shown) and a projection lens unit 90 which magnifies and projects the light beam whose optical path is changed by the optical path change unit 85 towards the screen.

A relay lens unit 70 which condenses and/or diverges the light transmitted from the light tunnel 100 to the image forming unit 80 is further provided along an optical path between the light tunnel 100 and the optical path change unit 85. The optical arrangements and operations of the light source 60, the light tunnel 100, and the relay lens unit 70 are substantially the same as those of the uniform light illuminating device described with reference to FIG. 8. Accordingly, detailed descriptions thereof will be omitted herein.

The image forming unit 80 forms an image by selectively transmitting or reflecting the light transmitted from the light tunnel 100. The image forming unit 80 can be classified as a reflection type image forming unit such as a digital micromirror device, a reflection type LCD (LCOS: liquid crystal on silicon) or a transmission type image forming unit such as a transmission type LCD which forms an image by selectively transmitting an incident light as units of pixels. Although in FIG. 10 the image forming unit 80 is a reflection type image forming unit, the present invention is not limited thereto and any form of transmission type image forming unit can be used therefor.

The optical path change unit 85 is arranged along the optical path between the light tunnel 100 and the image forming unit 80. Light tunnel 100 directs light emitted from the light source 60 towards the image forming unit 80. An image formed by the image forming unit 80 is directed by optical path change unit 85 towards the projection lens unit 90. To this end, the optical path change unit 85 includes a critical angle prism 87 and a compensation prism 89 arranged to face a surface of the critical angel prism 87.

The critical angle prism 87 includes an incident surface 87a arranged to face the relay lens unit 70, a transmission/reflection surface 87b for reflecting the light emitted from the light source 60 and transmitting an effective light corresponding to an image formed by the image forming unit 80, and the exit/reflection surface 87c arranged to face the image forming unit 80. The compensation prism 89 is arranged to face the transmission/reflection surface 87b and refracts and transmits incident light rays. Thus, the shape of the image formed by the image forming unit 80 is corrected by the compensation prism 89 so that its ratio corresponds to the size of the screen.

A projector according to the present embodiment further includes a color separation unit 95 for separating along the light emitted from the light source 60 into constituent colors. The color separation unit 95 is arranged on an optical path between the light source 60 and the image forming unit 80. The color separation unit 95 includes a color wheel 97 and a driving source 99 for rotating the color wheel 97. The color wheel 97 includes a plurality of color filters (not shown) which selectively transmit light rays having a predetermined wavelength corresponding to a particular constituent color of a white light emitted from the light source 60. The color wheel 97 is arranged to rotate so that the respective color filters are sequentially arranged to cross an optical path.

Figure 11:
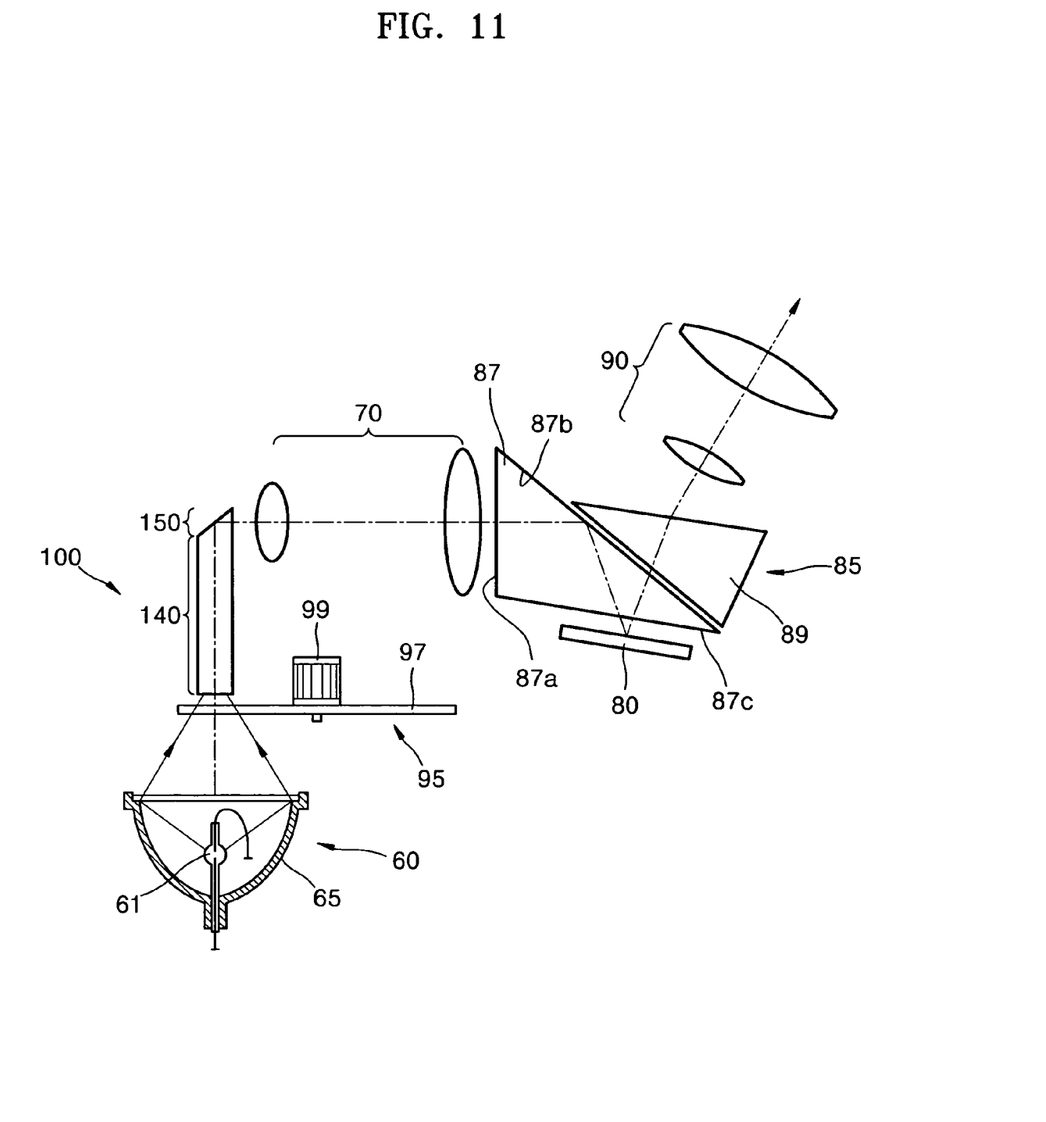
FIG. 11 is a view illustrating the optical arrangement of a projector according to another embodiment of the present invention.

Referring to FIG. 11, a projector according to another embodiment of the present invention includes a light source 60, a light tunnel 100 for changing light emitted from the light source 60 to a uniform light beam, an image forming unit 80 for forming an image, an optical path change unit 85 for changing an optical path so that the image formed by the image forming unit 80 is directed towards a screen (not shown) and a projection lens unit 90 for magnifying and projecting light which has its optical path redirected by the optical path change unit 85 towards the screen.

Compared to the projector according to the above embodiment, the projector according to the present embodiment is different in that the shape of the light tunnel 100 is modified. Since the other constituent elements are substantially the same as those of the projector according to the previous embodiment, detailed descriptions thereof will be omitted herein.

The light tunnel 100 changes the direction of the light rays emitted from the light source 60 by about 90° and simultaneously merges the light rays into a uniform light beam. Since the light tunnel 100 is substantially the same as the light tunnel 100 according to the second and fourth embodiments described with reference to FIGS. 4 and 7, respectively, a detailed description thereof will be omitted herein.

As described above, by adopting the light tunnel having functions of making a uniform light beam and redirecting its optical path, the space used to arrange the various components can be relatively compact without the need to employ additional optical elements such as a reflection mirror. As such, the overall size of the projector, including the depth of its cabinet, can be reduced to form a compact unit.

As described above, since the light tunnel also has a function of redirecting the optical path, the direction of an incident light and/or the exit light can be changed to meet the requirements of a compact design. Thus, the optical arrangement of an optical device adopting the light tunnel is easily formed.

The uniform light illuminating device adopting the light tunnel can facilitate the optical arrangement of the light source and the relay lens unit in a given space arrangement, without adopting additional optical elements such as a reflection mirror. Also, since the entire length of the uniform light illuminating device is reduced, the uniform light illuminating device can be made compact.

Furthermore, since the projector according to the present invention adopts the light tunnel having the functions of making a uniform light beam and changing an optical path, the arrangement space can be efficiently utilized without adopting optical elements such as an additional reflection mirror. Thus, the overall size of the projector, in particular, the depth of a cabinet of the projector, can be reduced so that the projector can be made more compact.

What is claimed is:

1. A light tunnel comprising:
    a guide member for directing an incident light to proceed therein while being reflected by a side wall thereof and to merge the incident light into a uniform light beam, the guide member having a first end portion and a second end portion; and
    optical path change portions provided respectively at the first end portion and the second end portion of the guide member, the optical path change portions each having an outer surface which is slanted with respect to an optical axis of the incident light, to reflect the incident light and redirect a path thereof;
    wherein the outer surface of one of the optical path change portions is slanted in a first direction and reflects the incident light to an inside of the guide member, the outer surface of the other optical path change portion is slanted in a second direction, such that the first direction is not parallel to the second direction, and reflects the light which proceeds in the guide member to an outside of the guide member, and
    wherein the side wall comprises a reflection portion, the reflection portion being between the optical path change portions such that the incident light reflected from the optical path change portion at the first end portion of the guide member is directed to the reflection portion and becomes uniform.

2. The light tunnel as claimed in claim 1, wherein the guide member comprises:
    a mirror case encompassing an inner space through which the light proceeds; and
    the reflection portion is formed on an inner wall of the mirror case.

3. The light tunnel as claimed in claim 2, wherein the optical path change portions comprise:
    an opening portion through which light is input or output; and
    a reflection mirror arranged at at least one end portion of the mirror case and inclined at a predetermined angle, to reflect an incident light and redirect a path thereof.

4. The light tunnel as claimed in claim 1, wherein the guide member is a glass rod which directs an input incident light at a predetermined angle to proceed therein while being totally reflected due to a difference in refraction rate between the glass rod and a surrounding medium.

5. The light tunnel as claimed in claim 4, wherein the optical path change portions are integrally formed at opposing end portions of the glass rod and inclined at a predetermined angle with respect to said side wall of the glass rod; and
    wherein a reflection mirror is formed at the outer surface of the optical path change portions for redirecting a path of an incident light by reflection.

6. A uniform light illuminating device comprising:
    a light source for generating light and directing the generated light in one direction;
    a light tunnel having a longitudinal side arranged to face the light source, the light tunnel directing a path of the light emitted from the light source and merging said light into a uniform light beam to exit from said light tunnel, the light tunnel having a first opening provided in the longitudinal side and a second opening provided in the longitudinal side;
    the light tunnel having a first axial end which is slanted in a first direction and a second axial end which is slanted in a second direction, the first axial end being distal to the second axial end such that the first direction intersects the second direction; and
    a relay lens unit arranged to face an exit opening of the light tunnel for condensing and/or diverging said uniform light beam for focusing on an image surface,
    wherein the light enters the light tunnel through the first opening and exits the light tunnel through the second opening, and
    wherein the light tunnel comprises a reflection portion, the reflection portion being between the first axial end and the second axial end of the light tunnel such that light is reflected from the first axial end of the light tunnel to the reflection portion and becomes uniform.

7. The uniform light illuminating device as claimed in claim 6, wherein the light tunnel comprises:
    a guide member for directing an incident light to proceed therein while being reflected by a side wall thereof and to merge the incident light into a uniform light beam;
    wherein the first axial end and the second axial end provide optical path change portions which are inclined at a predetermined angle with respect to an optical axis of the incident light, to reflect the incident light and redirect a path thereof.

8. The uniform light illuminating device as claimed in claim 7, wherein the guide member comprises:
    a mirror case encompassing an inner space through which the light proceeds; and
    the reflection portion is formed on an inner wall of the mirror case.

9. The uniform light illuminating device as claimed in claim 8, wherein at least one of the first axial end and the second axial end include a reflection mirror arranged at at least one end portion of the mirror case and inclined at a predetermined angle, to reflect an incident light and redirect a path thereof.

10. The uniform light illuminating device as claimed in claim 7, wherein the guide member is a glass rod which directs an input incident light at a predetermined angle to proceed therein while being totally reflected due to a difference in refraction rate between the glass rod and a surrounding medium.

11. The uniform light illuminating device as claimed in claim 10, wherein the optical path change portions respectively compromise an inclination portion integrally formed at an end portion of the glass rod and inclined at a predetermined angle with respect to said side wall of the glass rod; and a reflection mirror formed at an outer surface of the inclination portion for redirecting a path of an incident light by reflection.

12. A projector comprising:

a light source for generating light and directing the generated light in one direction;

a light tunnel arranged to face the light source for directing a path of the light emitted from the light source and merging said light into a uniform light beam at exit from said light tunnel; and an image forming unit for forming an image by selectively transmitting or reflecting said uniform light beam transmitted from the light tunnel;

an optical path change unit arranged along an optical path between the light tunnel and the image forming unit for directing an optical path so that the uniform light beam output from the light tunnel passes through the image forming unit and proceeds toward a screen; and a projection lens unit projecting the image formed by the image forming unit onto the screen, wherein the light tunnel comprises a reflection portion, the reflection portion being between the first axial end and the second axial end of the light tunnel such that light is reflected from the first axial end of the light tunnel to the reflection portion and becomes uniform.

13. The projector as claimed in claim 12, further comprising a color separation unit arranged along an optical path between the light source and the image forming unit for separating color from the light emitted from the light source.

14. The projector as claimed in claim 13, wherein the color separation unit comprises:

a color wheel having a plurality of color filters for selectively transmitting light rays having a predetermined wavelength corresponding to a particular constituent color of a white light emitted from the light source and capable of rotating so that each color filter is arranged to sequentially intersect the optical path; and a driving source for rotating the color wheel.

15. The projector as claimed in claim 12, wherein the image forming unit is one of a digital micromirror device, a transmission type LCD, and a reflection type LCD.

16. The projector as claimed in claim 12, wherein the light tunnel comprises:

a guide member for guiding an incident light to proceed therein while being reflected by a side wall thereof and to merge the incident light into a uniform light beam; and an optical path change portion provided at at least one end portion of the guide member inclined at a predetermined angle with respect to an optical axis of the incident light, to reflect the incident light and redirect a path thereof.

17. The projector as claimed in claim 16, wherein the guide member comprises:

a mirror case encompassing an inner space through which the light proceeds; and the reflection portion is formed on an inner wall of the mirror case.

18. The projector as claimed in claim 17, wherein the optical path change portion comprises:

an opening portion through which light is input or output; and a reflection mirror arranged at at least one end portion of the mirror case and inclined at a predetermined angle, to reflect an incident light and a path thereof.

19. The projector as claimed in claim 16, wherein the guide member is a glass rod which directs an input incident light at a predetermined angle to proceed therein while being totally reflected due to a difference in refraction rate between the glass rod and a surrounding medium.

20. The projector as claimed in claim 19, wherein the optical path change portion comprises:

an inclination portion integrally formed at at least one end portion of the glass rod and inclined at a predetermined angle with respect to said side wall of the glass rod; and a reflection mirror formed at an outer surface of the inclination portion for redirecting a path of an incident light by reflection.

21. The light tunnel as claimed in claim 1, wherein the optical path change portions are configured so that light enters the guide member along a first direction and exits the guide member along a second direction which is opposite the first direction.

22. The uniform light illuminating device as claimed in claim 6, wherein the light tunnel is configured so that light enters the light tunnel along a first direction and exits the light tunnel along a second direction which is opposite the first direction.

23. The light tunnel as claimed in claim 2, wherein the inner wall extends straight between the first end portion and the second end portion of the guide member.

24. The uniform light illuminating device as claimed in claim 8, wherein the inner wall extends straight between the first axial end and the second axial end of the light tunnel.

* * * * *